United States Patent
Pfeil et al.

(10) Patent No.: US 6,522,967 B1
(45) Date of Patent: Feb. 18, 2003

(54) POWERED PARK BRAKE RELEASE ALGORITHM

(75) Inventors: Michael C. Pfeil, South Charleston, OH (US); Gary C. Fulks, Spring Valley, OH (US); Paul F. Flanagan, Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 15 days.

(21) Appl. No.: 09/931,519

(22) Filed: Aug. 16, 2001

(51) Int. Cl.[7] .......................... F16D 65/36; G06F 17/00
(52) U.S. Cl. ......................... 701/70; 701/36; 188/171
(58) Field of Search ................. 701/70, 36, 1; 303/15, 16, 20; 180/65.1, 65.3; 188/156, 171; 192/220.2

(56) References Cited

U.S. PATENT DOCUMENTS

| | | | | |
|---|---|---|---|---|
| 4,892,014 A | * | 1/1990 | Morell et al. | 477/92 |
| 5,962,931 A | * | 10/1999 | Maron et al. | 307/125 |
| 6,386,338 B1 | * | 5/2002 | Powrozek | 188/156 |

* cited by examiner

Primary Examiner—Tan Q. Nguyen
(74) Attorney, Agent, or Firm—Scott A. McBain

(57) ABSTRACT

Apparatus, method and program product that controls the release of an electronically activated parking brake. An algorithm adjusts for cable stretch and limits the occurrence of over-release and wheel drag within the brake system. A controller monitors force incident on an actuator during a brake release operation. When a preset load is indicated, the controlling parameter of the algorithm transitions from force to position control. Once in position control, the controller uses previous position measurements and equipment specific constants to calculate a release point.

20 Claims, 2 Drawing Sheets

POWERED PARK BRAKE RELEASE ALGORITHM

FIELD OF THE INVENTION

The present invention relates to a brake system, and more particularly to a method, apparatus and program product for controlling the release of a parking brake.

BACKGROUND OF THE INVENTION

Most vehicle designs incorporate parking brakes. Typical parking brake configurations continuously employ regular drum brakes on a rear wheel. Parking brakes commonly rely on simple mechanical linkage to engage the brakes. When engaging an electronically-actuated braking system, an actuator may pull a steel brake cable taut in response to an operator depressing a pedal, lever or button. The resultant tension on the cable is transferred to the end of a brake lever. Other cables may draw brake shoes firmly against the drums in response to the lever's rotation. As such, the brake shoes restrict vehicle movement.

During release, depression of a knob or button causes the actuator to return to its initial position. The movement of the actuator reintroduces slack into the cables and, consequently, disengages the brake shoes. As such, the success of a brake release operation may depend largely upon the manner in which the actuator releases tension in the brake cable. For instance, should the actuator travel too far, too much cable may be released. This condition requires the actuator to reel in excessive cable slack prior to re-engaging the parking brake, translating into system delays and damage. Conversely, if the actuator does not travel far enough, then too little of the cable will be released. This condition may prevent the brake pads from fully releasing, resulting in wheel drag. Drag may retard vehicle performance, while causing overheating and damage to brake pads and other system components.

To reduce the occurrence of over-release and drag, some brake manufacturers incorporate brake system features that use periodic position adjustments to regulate cable release. For instance, a position adjuster proximate an actuator may periodically retract cable slack to compensate for lining wear and stretching. Another position-based release mechanism consistently moves the actuator a set distance that ideally corresponds to an optimum brake release point. The set distance may manually be adjusted at service intervals to compensate and accommodate for system wear factors. In practice, however, cable stretching and other aging factors cause release points to substantially migrate in between adjustments, promoting drag and over-release.

Other manufacturers rely exclusively on the force-sensing mechanisms to address over-release and wheel drag. Such a system conventionally causes the actuator to travel until a sensor indicates that no load is incident on the brake cable. The position reached by the actuator when zero force is sensed theoretically coincides with an optimum release point, i.e, no drag or over-release. However, errors inherent to the sensors used in these systems tolerate brake system error. For example, a transducer may register zero pounds of force on a cable that actually carries an eight pound load. Such a scenario results in the system halting the release of the cable before the brake shoes disengage. Consequently, there is a need for a brake release mechanism operable to reduce the occurrence of both over-release and wheel drag.

SUMMARY OF THE INVENTION

The present invention provides an apparatus, program product and method for controlling the release of an electronically activated parking brake mechanism. A controller may actively monitor a force that is incident on a brake cable element. Program code, executed by the controller, may initiate actuation of the brake cable element. The element may continue to move until a preset load level is indicated. Coincident with the detection of the preset load, the controller may record the position of the brake cable element. A command from the controller may then cause the brake cable element to travel an additional increment. Ultimately, the brake cable element may traverse to a release point that is determined as a function of at least a stored position and the additional increment. The controller may then initiate a second force measurement to ensure the absence of a load on the brake cable element.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
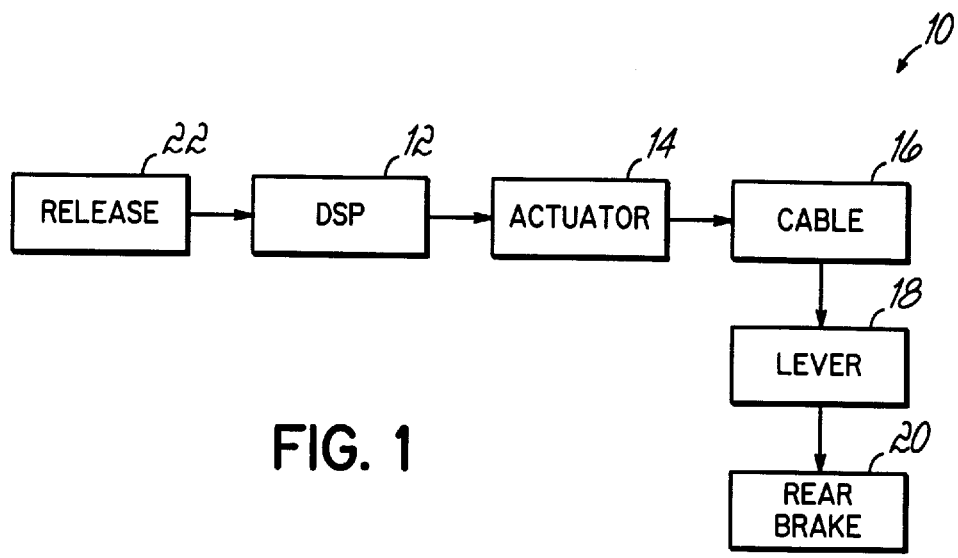
FIG. 1 is a block diagram that illustrates a brake system environment consistent with the principles of the present invention.

The block diagram of FIG. 1 illustrates a brake system environment 10 that is consistent with the principles of the present invention. The brake system 10 employs both force and position control functions to regulate the release of a parking brake. Generally, a controller 12 may execute a combined load/position algorithm configured to control the movement of an actuator 14. The actuator may be configured to pull and release a brake cable coupled to a break mechanism. The algorithm controlling the movement of the actuator may account for cable stretch while limiting the occurrence of both drag and over-release within the brake system.

During a brake release operation, the controller 12 may monitor the force acting on a brake cable element, such as the actuator 14. The controller 12 may continue to monitor the diminishing force acting on the element until a preset load level is indicated. The program resident on the controller may subsequently transition to position control mode. As such, the control parameter that drives the algorithm may switch from cable tension to actuator position. For instance, the controller 12 may command the actuator 14 to move to a specific point along its path of travel. One embodiment may combine stored position measurements with equipment specific constants to calculate an additional increment of element travel. The embodiment causes the element to move this additional distance to ensure the complete release of a brake lever 18.

Generally, the illustrated embodiment couples the actuator 14 to a brake cable 16. The brake cable 16, in turn, attaches to the brake lever 18. The brake lever is operable to actuate rear drum brakes/calipers 20. As such, the travel of the actuator 14 causes a force to be transferred to the brake lever 18 via the cable 16. Turning more specifically to FIG. 1, an operator may initiate a parking brake release sequence by actuating a release mechanism 22, such as a button or lever. The mechanism 22 may transmit a release signal to the controller 12, or some other suitable microprocessor.

The release signal may initiate processing of a release program resident in the controller 12. A program consistent with the principles of the invention may embody an algorithm that comprises both force and position related functions. The program may instruct the controller 12 to transmit a command to a motor in the actuator 14. In addition to the motor, the actuator 14 may incorporate force/position sensors, a power screw and a gear set for gaining mechanical advantage. In response to the command, the actuator 14 may travel along the axis of the brake cable 16. Alternatively, it will be appreciated that movement of the actuator 14 may occur in any direction corresponding to an increase or decrease of cable 16 tension. This movement of the actuator 14 incrementally releases cable tension according to a preset, program release sequence.

A transducer, or other suitable force sensor, may concurrently measure the load incident on the actuator 14. The forces acting on the actuator 14 are a product of the tension and strain transferred via the cable 16. Of note, the transducer may measure force in terms of motor current, or by any other conventional standard. The transducer may relay the measured force back to the controller 12. Based upon the force measurement, the controller 12 may continue to release the cable 16 via the actuator 14 until a preset load registers at the transducer. For instance, the actuator may continue to move until the transducer reports some force ratio or preset load.

Once the preset load is achieved, the program may instruct the controller 12 to transition from operation within the force control mode to that of position control mode. This may initially involve storing the current position of the actuator 14 within the memory of the controller. While operating in position mode, the controller 12 may instruct the actuator 14 to proceed to a predetermined release point. The release point may correspond to a specific position along the actuator's path of travel. The program may determine the release point as a function of a stored position and a calculated, additional increment. The stored position may correspond to a recorded position of the actuator 14 during the prior release operation. For instance, the controller 12 may have stored the position of the actuator 14 coincident with the end of the previous force control cycle.

In a preferred embodiment, the program may augment this stored position with a calculated, additional increment. The program may include the additional increment to ensure the complete release of the brake cable 16. The embodiment may release the cable 16 this additional distance via the actuator 14. The additional release may, in part, serve to account for marginal errors inherent to the transducer measurement. For instance, the transducer may erroneously register zero pounds when a fraction of force actually remains incident on the cable 16. Left uncorrected, the residual tension in the cable 16 causes the rear brakes 20 to remain engaged. Consequently, one embodiment of the program may instruct the controller 12 to drive the actuator 14 for a period corresponding to the additional increment. For example, the motor of the actuator 14 may cause the cable 16 to release an additional quarter inch.

The program may determine the additional increment as a function of a transducer margin of error, a linearized spring constant and other scaling factors. Specifically, the embodiment may rely on the following equation to calculate the additional increment, $x_0$:

$$x_0 = c^* f_{err}/k_0$$

In the equation, $f_{err}$ corresponds to the margin of error associated with the sensor. The program may additionally apply a scaling factor, c, to increase and otherwise adjust output for safety considerations. The linearized spring rate, $k_0$, as discussed below in detail, reflects equipment-specific performance characteristics. The program may ultimately use the additional increment to calculate a release point for the operation.

As such, the predetermined release point corresponds to the stored position, plus the additional increment. The controller 12 may command the actuator 14 to travel until that release point along the axis of the cable 16 is achieved. A position measuring device may monitor, verify and report the position of the actuator 14 back to the controller 12. Thus, the program will continue releasing the cable until the actuator 14 traverses a distance which ensures full release of the brake drums 20. Before ending the release operation, one embodiment may re-employ the force transducer to verify that no load is present on the actuator.

Figure 2:
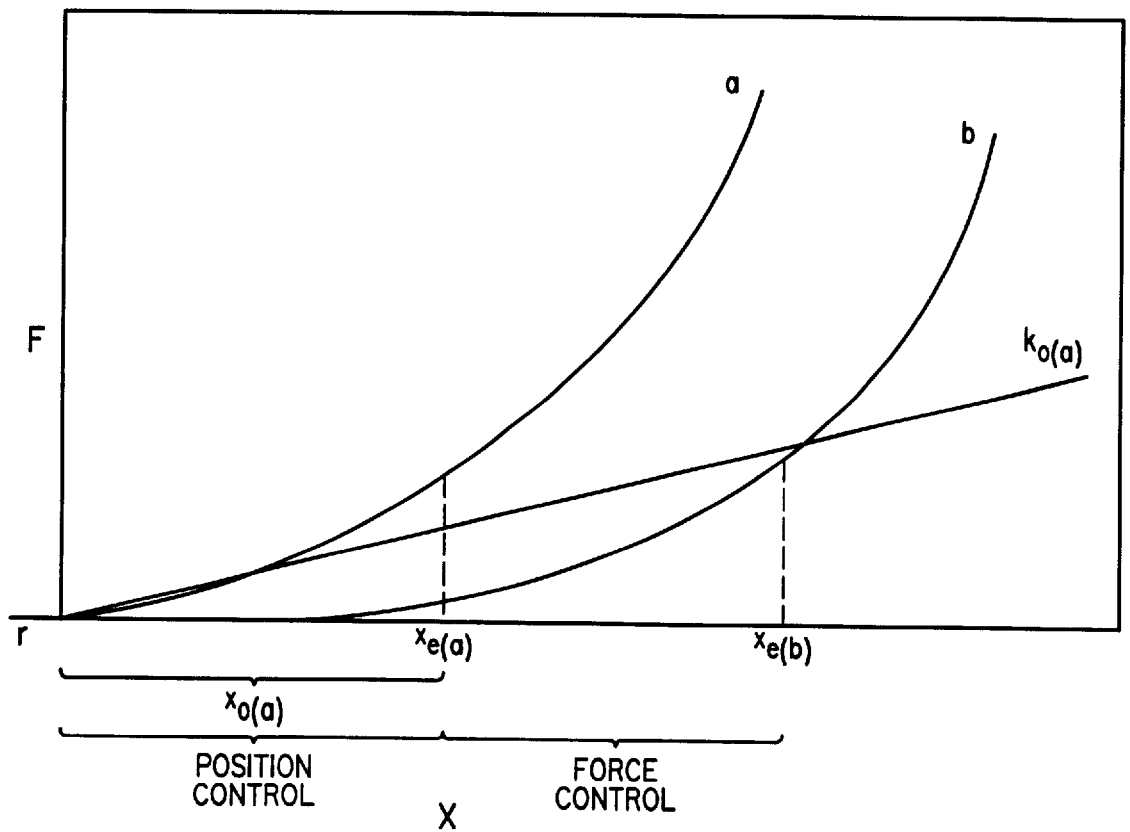
FIG. 2 is a graph representing forces incident on the actuator of FIG. 1 versus distance of the actuator.

FIG. 2 illustrates an empirical representation of the load, F, acting on the actuator of FIG. 1 relative to its distance, x, from a set reference point. As shown in the graph, line "a" depicts the nonlinear decrease of forces incident on the actuator during a release operation. Ideally, the actuator would continue to release brake cable until all load was removed from the actuator. As discussed above, however, inaccuracies associated with sensing devices can prematurely indicate a zero load condition. Such a premature reading is denoted on the graph as "$x_{e(a)}$." While the actual travel corresponding to $x_{e(a)}$ may be less than an inch, it can nonetheless result in substantial system drag. That is, tension transferred to the brake lever from the cable is never completely relieved. As such, brake pads will continue to retard vehicle motion, harming system components and performance.

Of note, the consequences of erroneous readings can become more pronounced over time, as illustrated by line "b." More particularly, line b represents the cumulative effects of use and aging for the same system as line a. As shown in the graph, the slope of line b has decreased relative to line a as a result of cable stretching and other wear. Significantly, the position corresponding to zero load for line b has also changed. Consequently, should the release operation abruptly end within force control mode, the actuator may fail to release an adequate amount of cable. Thus, while force control mode helps to accommodate changing load requirements, a position control parameter may still be needed to account for measurement error.

To account for such error, one embodiment of the invention may cause the actuator to travel an additional increment, $x_{0(a)}$. This travel ensures the removal of any undetected force that remains incident on the cable. Particularly, the position control mode may calculate $x_{0(a)}$ in such a manner that it is always larger than $x_{e(a)}$. As discussed above in detail, the program may determine $x_{0(a)}$ as a product of both transducer error and a linearized spring constant. Turning to FIG. 2, line $k_{0(a)}$ graphically represents such a linearized spring constant. The slope of line $k_{0(a)}$ corresponds to the differential equation of actuator force over position at F=0. Of note, the slope and associated value of $k_{0(a\ \&\ b)}$ adjusts as the system ages. Ultimately, the embodiment may combine the additional increment $x_{0(a)}$ with a stored position $x_{e(b)}$ to arrive at a release point, r.

Figure 3:
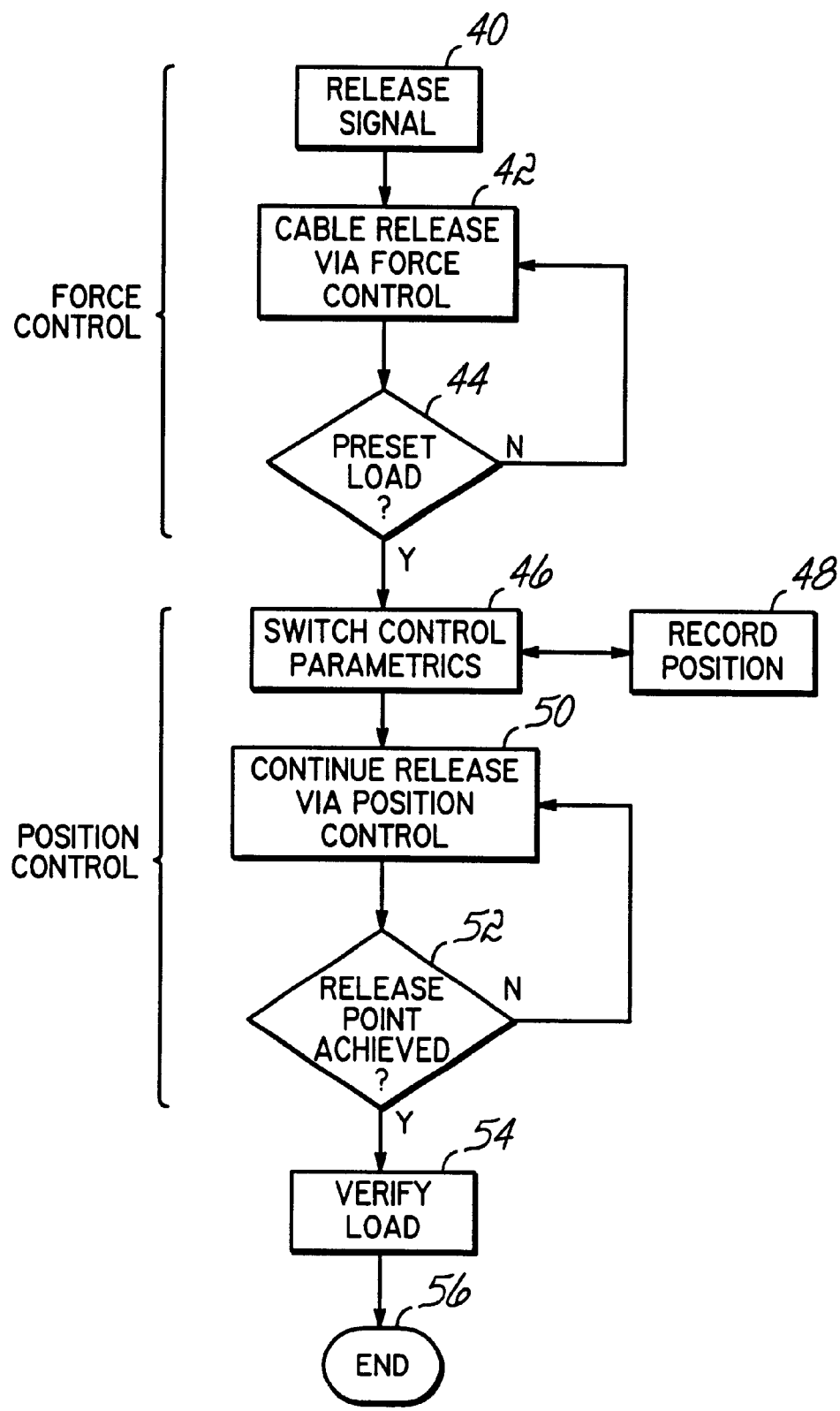
FIG. 3 is a flowchart that embodies steps suited for implementation within the brake system environment of FIG. 1.

The flowchart of FIG. 3 illustrates process steps suited for implementation within the brake system environment of FIG. 1. At block 40, an operator may push a button or pull a lever configured to initiate a release sequence. In response, an actuator moves in such a manner as to release a brake cable according to a preset sequence. Tension within the cable may decrease as the actuator travels at block 42. A transducer positioned on the actuator may concurrently measure the load transferred from the cable. At block 44, the transducer may determine whether a preset load level is present. If not, the embodiment may continue to release the cable according to a force control protocol at block 42.

Should the preset load level subsequently register at block 44, then the embodiment may switch to position control mode at block 46. That is, a control signal may be generated in response to a transducer reading of zero pounds. The control signal may cause the embodiment to record the current position of the actuator at block 48. The position control protocol may later recall and apply this stored position when calculating a position release point for subsequent application.

At block 50, the embodiment may release the actuator some additional, incremental distance. The embodiment may include the additional increment to accommodate a margin of error associated with the force transducer. Once in position control mode, a position measuring device may continuously monitor the travel of the actuator at block 50. The measurements, concurrent with the release of the cable, may continue until the actuator arrives at a predetermined release point. As discussed in detail above, the embodiment may calculate the release point as a function of stored element position, transducer error, spring ratio and other scaling factors.

More particularly, a position stored at block 48 during a prior application may be augmented with the additional increment of distance. The addition of the increment may act to reduce the occurrence of drag. Once the release point is achieved at block 52, actuator travel may cease. Prior to ending the release operation at block 56, the embodiment may re-employ the force transducer at block 54 to verify that no load is, in fact, incident on the cable.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A method for controlling the release of a parking brake mechanism having a brake cable coupled to an actuator, comprising:
   monitoring a force incident on at least one of the actuator and the brake cable;
   moving the brake cable and the actuator until a preset load level is detected;
   moving the brake cable and the actuator an additional increment after the preset load is detected.

2. The method according to claim 1, further comprising recording a position of at least one of the actuator and the brake cable coincident with an indication of the preset load level.

3. The method according to claim 1, further comprising determining the additional increment as a product of parameters selected from among the group comprising: force, brake cable element position, linearized spring rate, equipment age and use.

4. The method according to claim 1, further comprising moving the brake cable element to a release point.

5. The method according to claim 1, further comprising determining the release point as a product of parameters selected from among the following group comprising: the additional increment, a brake cable position, an actuator position and the linearized spring rate.

6. The method according to claim 1, further comprising monitoring a second force incident on the actuator after the actuator achieves the release point.

7. The method according to claim 1, further comprising moving the actuator and brake cable until a zero force load is indicated.

8. An apparatus for controlling the release of a parking brake, comprising:
   a brake mechanism operable to restrict movement of a vehicle;
   a brake cable element configured to operatively couple to the brake mechanism and further configured to move in response to a command;
   a memory;
   program code configured to instruct the brake cable element to move until a preset force level is indicated, wherein the program code further instructs the brake element to move an additional increment after the preset force level is indicated; and
   a controller electronically coupled to the brake cable element and operable to execute the program code, wherein the controller further generates the command according to an instruction from the program.

9. The apparatus of claim 8, wherein the program code records a position of the brake cable element coincident with an indication of the preset load level.

10. The apparatus of claim 8, wherein the program code determines the additional increment as a product of parameters selected from among the group comprising: force, brake cable element position, linearized spring rate, equipment age and use.

11. The apparatus of claim 8, wherein the program code initiates moving the brake cable element to a release point.

12. The apparatus of claim 8, wherein the program code determines the release point as a product of parameters selected from among the following group comprising: the additional increment, a brake cable element position and the linearized spring rate.

13. The apparatus of claim 8, wherein the program code monitors a second force incident on the brake cable element after the brake cable element achieves the release point.

14. The apparatus of claim 8, wherein the program code initiates moving the cable brake element until a zero force load is indicated.

15. The apparatus of claim 8, wherein the brake cable element is an actuator.

16. The apparatus of claim 8, wherein the brake cable element is a cable.

17. A program product for controlling the release of a parking brake, comprising:
   a program configured to instruct a brake cable element to move until a preset force level is indicated, wherein the program further instructs the brake element to move an additional increment; and
   a signal bearing medium bearing the program.

18. The program product of claim 17, wherein the signal bearing medium includes a recordable medium.

19. The program product of claim 17, wherein the signal bearing medium includes a transmission type medium.

20. An apparatus for controlling the release of a parking brake, comprising:

a means for monitoring a force incident on a brake cable element;

a means for moving the brake cable element until a preset load level indicated;

a means moving the brake cable element an additional increment.

* * * * *